H. KOTTEN.
SHAFT AND PULLEY GUARD.
APPLICATION FILED OCT. 4, 1915.

1,175,065.

Patented Mar. 14, 1916.

2 SHEETS—SHEET 1.

Inventor:
Hugo Kotten

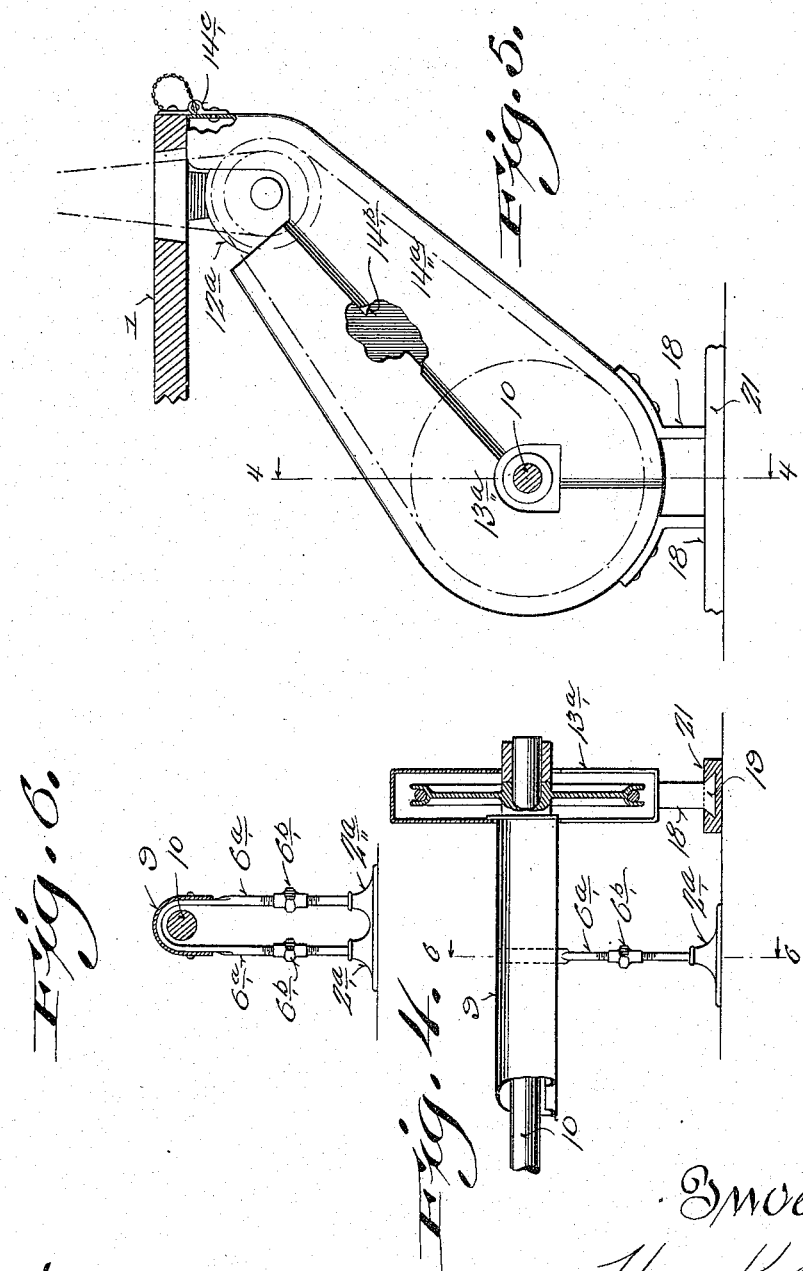

UNITED STATES PATENT OFFICE.

HUGO KOTTEN, OF MILWAUKEE, WISCONSIN, ASSIGNOR TO J. H. RICE & FRIEDMANN CO., OF MILWAUKEE, WISCONSIN.

SHAFT AND PULLEY GUARD.

1,175,065.  Specification of Letters Patent.  Patented Mar. 14, 1916.

Application filed October 4, 1915. Serial No. 53,870.

*To all whom it may concern:*

Be it known that I, HUGO KOTTEN, a citizen of the United States, and resident of Milwaukee, in the county of Milwaukee and State of Wisconsin, have invented certain new and useful Improvements in Shaft and Pulley Guards; and I do hereby declare that the following is a full, clear, and exact description thereof.

This invention relates to the subject of shaft and pulley guards, and has specially in view guards for shafts and pulleys that may be readily put in position to prevent the clothing of the operators being caught by the shafts and pulleys.

The invention is of especial value in connection with sewing machines, such as used in factories where the operators are usually females and the machines used of a type wherein the shafts and pulleys are located beneath the table and hence the clothing of the operators are frequently caught by the shafts and pulleys and in many instances the operators are severely injured. Also in such factories the work in finished or unfinished condition is piled close to the machines and frequently portions of the piles come in contact with the shafts and pulleys. It is therefore, the primary aim of this invention to avoid accidents, such as stated in the foregoing, and other instances from occurring.

Simple and practical embodiments of the invention are shown in the accompanying drawings wherein—

Figure 1:
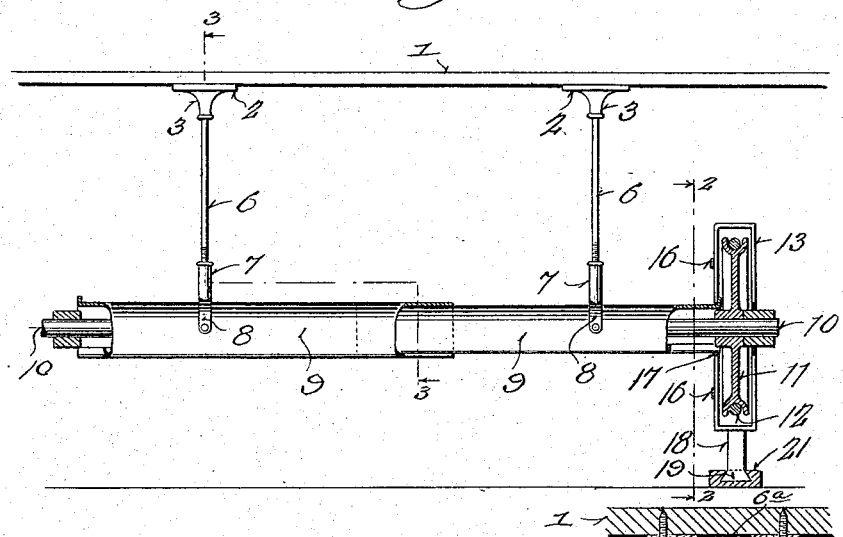
Figure 2:
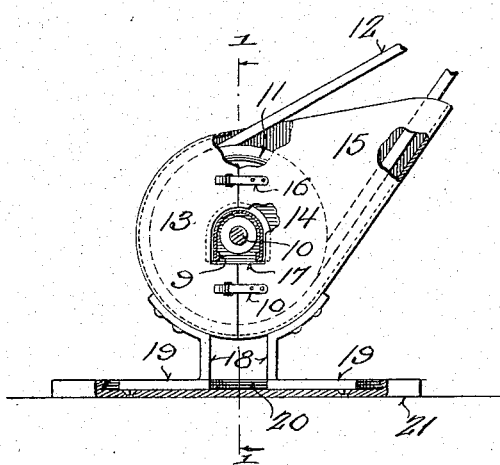
Figure 3:
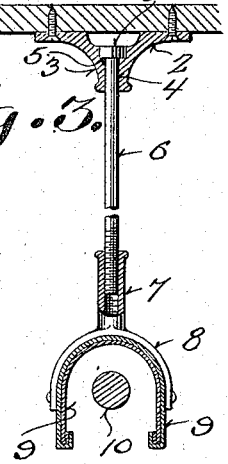

Figure 1 is a view in section taken substantially on the line 1—1, Fig. 2, of a machine, having its shafting and pulleys equipped with the improved guard. Fig. 2 is a vertical sectional view taken on the line 2—2 Fig. 1. Fig. 3 is a vertical sectional view taken on the line 3—3, Fig. 1. Fig. 4 is a sectional view taken on the line 4—4, Fig. 5. Fig. 5, is a view in side elevation of a variation of the invention. Fig. 6 is a sectional view taken on the line 6—6 Fig. 4.

The improved shaft and pulley guard is capable of being used in connection with many varieties of shafts and pulleys, an example being shown in the accompanying drawings wherein a conventional representation of a machine table has been shown of the type wherein the shaft and pulley are below the table top. The table top has been designated by the numeral 1, and its bottom surface is equipped with dished hanger plates 2, having a tapering pendent socket portion 3 provided with a central opening 4. At the junction of the dished portion of the plates and the upper end of the opening 4, a seating ledge 5 is provided, the seating ledges being preferably rectangular. Hanger rods 6 extend through the openings of plates 2 and their rectangular heads 6ª seat on the ledges 5 so that turning movements of the rods 6 while their heads are on the ledges is prevented. The lower ends of the rods 6 are threaded for engaging the threaded sockets 7 of the arms 8 that embrace and are riveted or otherwise secured to the shaft guards 9 9. The shaft guards 9 are preferably formed in sections, the meeting ends of which telescope as shown in Fig. 1 of the drawings to permit adjustments to be readily obtained. The guards 9 are preferably U shaped in cross section so that they will overlap and hang well below the shaft 10. The described manner of suspending the guards 9 from the hanger plates 2 permits vertical adjustments of the guards, such adjustments being effected by raising the rods 6 until their heads are in the dished portion of the plates 2, whereupon by rotating said rods, the desired vertical adjustment of the guards 9 is obtained through the thread connection of the rods and the socket 7.

In Figs. 4 and 6, of the accompanying drawings, the shaft guard 9 has been shown supported from the floor, instead of suspended from the table, as in the preceding figures. In this form of the invention, the guard 9 embraces the looped end of the supporting rods 6ª, such rods being mounted in the floor sockets 2ª. Rods 6ª are preferably made in two sections that are connected by the turn-buckles 6ᵇ to permit vertical adjustments of the rods 6ª.

A guard casing is provided for the pulley 11 and the drive belt 12, such casing being in two sections 13 and 14 respectively. The section 14 has a conical portion 15 that projects upward in a direction the same as the lower flight of belt 12, and is open at its top so that both flights of the belt project therethrough. The pulley guard sections 13 and 14 are shaped so that they entirely inclose the pulley 11, and their meeting edges are separably fastened together by the latches 16. The inner surfaces of the sections 14 and 15 are cut away for the reception of that portion of the shaft 10 that extends to the pulley 11, and such openings, designated by the numeral 17 are larger than, and of the same contour as the shaft guard 9. Each pulley guard section is supported by and riveted or otherwise fastened to the curved upper end portion of a leg 18 having an elongated flat foot 19, that is shaped for sliding engagement with the groove 20 of the base plate 21, that is fastened to the floor. The groove 20 and the foot 19 have what is termed a dovetail connection. The described manner of supporting the two sections of the pulley guards readily permits said section to be separated to give access to the pulley, as will be apparent.

In Fig. 5 of the accompanying drawings, a variation of the pulley guard has been shown, wherein the guard incloses the belt 12, and also part of the transmitting pulley 12$^a$. The pulley guard in this form of the invention is formed in two sections 13$^a$ and 14$^a$, the meeting edges of the sections being formed so that they interlock. Such interlocking engagement is obtained by making the meeting edge of section 14$^a$, in the form of a V, designated by the numeral 14$^b$, to form a pocket for the reception of the adjacent edge of section 13$^a$. The upper end portion of section 14$^a$, has a hinge connection, 14$^c$ with the table 1, the hinge connection being preferably of the type wherein the hinge pintle is flexibly anchored to one leaf of the hinge, to permit the pintle to be readily withdrawn, and thereby disconnect the hinged sections, so that the section 14$^a$ of the guard may be removed from its operating position. As aforesaid, the shaft opening 17 of the pulley guard is larger than, but of the same contour as the shaft guard 9, and when the said shaft and pulley guards are assembled, one end of the shaft guard is within the pulley guards and such end is provided with an outturned flange portion that engages over the edges of the opening 17, as shown in Fig. 1 of the drawings, and through such engagement prevents accidental separation of the pulley and shaft guards. To separate the pulley and shaft guards, the pulley guard sections are unlatched and then spread relatively through their tongue and groove connection with floor plate 21, whereupon the shaft guard is free to be manipulated as desired.

I claim:

1. A pulley and shaft guard comprising a shaft guard, means for vertically adjusting and supporting the same, a pulley guard formed in sections and having an interlocking engagement with one portion of the shaft guard, and means for supporting and relatively adjusting the pulley guard sections transversely.

2. A shaft and pulley guard comprising a shaft guard having an outwardly projecting end flange, means for supporting and vertically adjusting the shaft guard, a pulley guard formed in sections having complemental cut-away portions forming an opening for the reception of the flanged end of the shaft guard, the edges of said opening being engaged by the end flange of the shaft guard, and means for supporting and transversely adjusting the pulley guard sections relatively.

3. A shaft and pulley guard comprising a shaft guard, arms carried thereby and provided with threaded sockets, supporting rods having threaded portions engaging the threads of the socket, plates supporting the rods and preventing rotary movement of the said ends, and a pulley guard having a separable connection with the shaft guards.

4. A shaft and pulley guard comprising a shaft guard having an end flange, and a pulley guard formed in separable sections having an opening for the reception of the flanged end of the shaft guard, and whose edges are interlocked with the flange of the shaft guard.

5. A shaft guard formed in sections having a telescoping connection to permit relative longitudinal adjustments thereof, and a pulley guard formed in two sections that are capable of being relatively spread and provided with an opening for the reception of the outer end of one of the shaft guard sections, the outer end of said shaft guard section having means for interlocking with the edges of the opening of the pulley guard.

6. A pulley and shaft guard comprising a shaft guard, a pulley guard formed in sections having a separable interlocking engagement with the shaft guard, a floor plate having a longitudinal groove therein and disposed transversely of the shaft guard, and supports carried by the pulley guard sections and engaging the groove of the floor plate.

7. A pulley guard formed in two separably connected sections with an independent support for each section and means for slidably connecting the supports to a floor to permit relative movements of the sections.

8. A pulley guard formed in separable sections, said sections having latch connections and being provided with an opening for the reception of a shaft guard, a floor plate having a longitudinal groove therein, and supporting legs for the sections having feet slidably mounted in the said groove.

9. A shaft guard comprising dished plates provided with pendent portions having openings therethrough, the inner ends of said openings being provided with seating ledges, supporting rods extending through said openings and having heads normally seated on the ledges, the outer ends of said rods being threaded, a guard, and arms embracing the guard and provided with standing threaded sockets that are engaged by the threaded portion of the rods.

10. A shaft and pulley guard comprising a shaft guard formed of telescoping sections, means for supporting and vertically adjusting the shaft guard, a pulley guard formed in two sections having an interlocking engagement with the outer end of one of the shaft sections, and means for supporting and permitting relative transverse movements of the pulley guard sections.

11. A shaft and pulley guard comprising a shaft guard having an end flange, means for supporting and vertically adjusting the shaft guard, a pulley guard formed of separably connected sections provided with an opening for the reception of the flanged end of the shaft guard and with the edge of which the end flange of said shaft guard interlocks, and means for supporting and relatively adjusting the pulley guard sections transversely.

In testimony that I claim the foregoing I have hereunto set my hand at Milwaukee, in the county of Milwaukee and State of Wisconsin, in the presence of two witnesses.

HUGO KOTTEN.

Witnesses:
GEORG GRIL,
E. M. SEAMAN.

Copies of this patent may be obtained for five cents each, by addressing the "Commissioner of Patents, Washington, D. C."